US012762252B2

(12) United States Patent
Uehara et al.

(10) Patent No.: US 12,762,252 B2
(45) Date of Patent: Oct. 13, 2026

(54) INFORMATION PROCESSING APPARATUS, INFORMATION PROCESSING METHOD, AND COMPUTER PROGRAM PRODUCT

(71) Applicant: KABUSHIKI KAISHA TOSHIBA, Tokyo (JP)

(72) Inventors: Tatsuya Uehara, Kawasaki Kanagawa (JP); Jun Kanai, Tokyo (JP); Yurie Shinke, Kawasaki Kanagawa (JP); Hiroho Wada, Yokohama Kanagawa (JP); Hayeong Shin, Tokyo (JP); Yuto Mashima, Yokohama Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 39 days.

(21) Appl. No.: 19/057,009

(22) Filed: Feb. 19, 2025

(65) Prior Publication Data

US 2025/0284821 A1 Sep. 11, 2025

(30) Foreign Application Priority Data

Mar. 5, 2024 (JP) ................................ 2024-033169

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 10,579,803 | B1 * | 3/2020 | Mueller | G06F 21/577 |
| 12,401,669 | B1 * | 8/2025 | Varakantam | G06F 21/57 |
| 2011/0131181 | A1 | 6/2011 | Ikuta et al. | |
| 2014/0173737 | A1 * | 6/2014 | Toback | G06F 21/57 726/25 |

(Continued)

FOREIGN PATENT DOCUMENTS

| | | | | |
|---|---|---|---|---|
| EP | 3989092 | A1 * | 4/2022 | G06F 16/188 |
| EP | 3 995 981 | A1 | 5/2022 | |

(Continued)

OTHER PUBLICATIONS

Japan Patent Office, Decision to Grant a Patent in JP App. No. 2024-033169 (Jul. 14, 2026).

*Primary Examiner* — Javier O Guzman
(74) *Attorney, Agent, or Firm* — Finnegan, Henderson, Farabow, Garrett & Dunner, LLP

(57) ABSTRACT

According to one embodiment, an information processing apparatus includes a hardware processor connected to a memory. The hardware processor extracts first file path information indicating a file path of a file used by a vulnerability inspection tool in vulnerability inspection of an object to be inspected. The file path is a file path in the object to be inspected. The hardware processor registers second file path information and the first file path information in correlation with each other in second management information. The second file path information indicates a file path to a file copied from the object to be inspected by using the first file path information.

8 Claims, 9 Drawing Sheets

(56) References Cited

U.S. PATENT DOCUMENTS

| | | | | |
|---|---|---|---|---|
| 2014/0244679 | A1* | 8/2014 | Fedorenko | G06F 16/40 707/758 |
| 2015/0156183 | A1* | 6/2015 | Beyer | H04L 63/145 726/4 |
| 2015/0264074 | A1 | 9/2015 | Mendelev et al. | |
| 2017/0032121 | A1* | 2/2017 | Kim | G06F 21/56 |
| 2019/0026472 | A1 | 1/2019 | Adam et al. | |
| 2020/0389483 | A1* | 12/2020 | Dye | G06F 21/577 |
| 2021/0117549 | A1 | 4/2021 | Mandagere et al. | |
| 2022/0318099 | A1* | 10/2022 | Kotwal | G06F 11/1451 |
| 2023/0376605 | A1* | 11/2023 | Maheshwari | G06F 21/577 |
| 2024/0095371 | A1 | 3/2024 | Uehara et al. | |
| 2025/0335282 | A1* | 10/2025 | Tiwary | G06F 11/323 |

FOREIGN PATENT DOCUMENTS

| | | | |
|---|---|---|---|
| JP | 2009-217637 | A | 9/2009 |
| JP | 2011-113397 | A | 6/2011 |
| JP | 2015-138509 | A | 7/2015 |
| JP | 2015-535997 | A | 12/2015 |
| JP | 2020-21309 | A | 2/2020 |
| JP | 2022-552891 | A | 12/2022 |
| JP | 2023-97605 | A | 7/2023 |
| JP | 2024-42396 | A | 3/2024 |

* cited by examiner

FIG.2A

16A1 (16A)

VULNERABILITY INSPECTING METHOD INFORMATION

```
<?xml version="1.0" encoding="utf-8"?>
<oval_definitions xmlns="http://oval.mitre.org/XMLSchema/oval-definitions-5" …>

<generator>
<product_name>OVAL Patch Definition</product_name>
<product_version>3</product_version>
<schema_version>5.10</schema_version>
<timestamp>2024-01-09T21:01:01</timestamp>
<content_version>123456</content_version>
</generator>
<definitions>
<definition class="patch" id="xxx:def:20991122" version="123">
<metadata>
<title>xxx bug fix</title>
<affected family="unix">
<platform>xxx Linux 8</platform>
</affected>
<reference ref_id="AAA-4444" ref_url="https://xxx.com/errata/ABC-4444" source="ABC"/>
<description>This is vulnerability for XXXX</description>
<severity>Moderate</severity>
<issued date="2019-07-30"/>
<cve cvss3="5.4/CVSS:3.0/AV:N/AC:L/PR:L/UI:N/S:U/C:L/I:L/A:N" cwe="CWE-XXX" impact="moderate" public="20190305">CVE-2019-9999</cve>
<cpe>cpe:/a:www:xxxx:1.23::</cpe>
</metadata>
<criteria operator="OR">
<criterion comment="XXXX is earlier than 1.2.3" test_ref="com.xxx:tst:20191992001"/>
<criteria operator="AND">
<criterion comment="YYY is enabled" test_ref="com.xxx:tst:20191992003"/>
</criteria>  </criteria> </definition>
⋮
</definitions>
```

OVAL FILE INFORMATION (lines 3–7)

VULNERABILITY INFORMATION (lines 9–27)

APPLICABILITY CONDITION (lines 23–27)

FIG.2B

16A2 (16A)

VULNERABILITY INSPECTING METHOD INFORMATION

TEST DEFINITION

```
29 <tests>
30 <rpminfo_test check="at least one" comment="XXXX is earlier than 1.2.3" id="com.xxx:tst:20191992001" version="123">
31 <object object_ref="com.xxx:obj20191992001"/>
32 <state state_ref="com.xxx:ste:20191992002 "/>
33 </rpminfo_test>

34 <textfilecontent54_test check="all" comment="Module YYYY is enabled" id="com.xxx:tst:20191992003" version="123">
35 <object object_ref="com.xxx:obj:20191992003"/>
36 <state state_ref=" ="com.xxx:ste:20191992003"/>
37 </textfilecontent54_test>
...
38 </tests>
```

TEST OBJECT

```
39 <objects>
40 <rpminfo_object id="com.xxx:obj20191992001" version="123">
41 <name>XXXX</name>
42 </rpminfo_object>
43 <textfilecontent54_object id="com.xxx:obj:20191992003" version="123">
44 <filepath datatype="string">/etc/xxx-module.conf</filepath>
45 <pattern operation="pattern match">yyy-enable:</pattern>
46 <instance datatype="int">1</instance>
47 </textfilecontent54_object>
...
48 </objects>
```

TEST OBJECT STATE

```
49 <states>
50 <rpminfo_state id="com.xxx:ste:20191992002" version="123"> <evr datatype="evr_string" operation="less than">1.2.3</evr></rpminfo_state>
51 <textfilecontent54_state id="com.xxx:ste:20191992003" version="123">
52 <text operation="pattern match">[yY]</text>
53 </textfilecontent54_state>
...
54 </status>
...
```

FIG.3

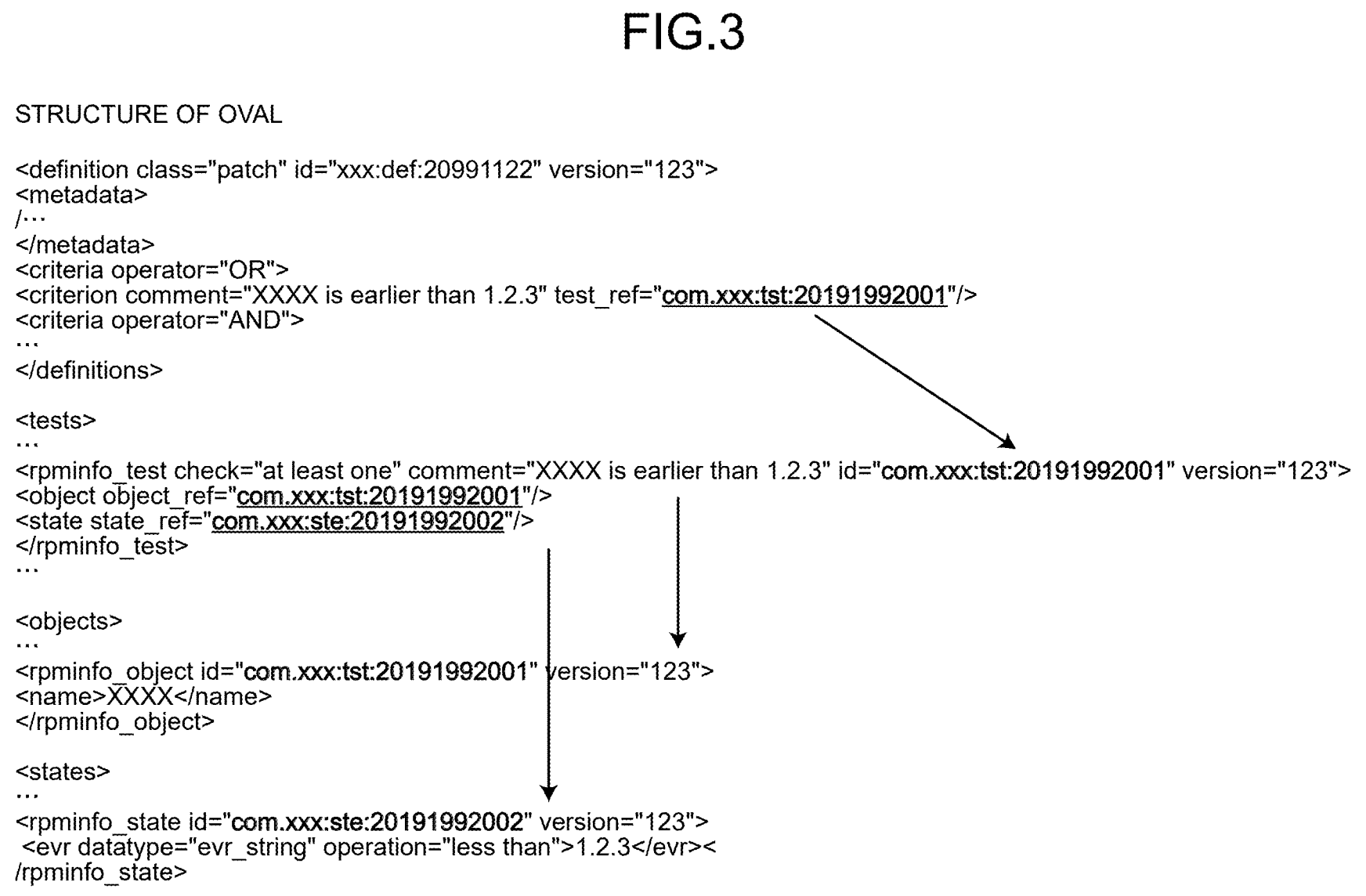

STRUCTURE OF OVAL

```
<definition class="patch" id="xxx:def:20991122" version="123">
<metadata>
/…
</metadata>
<criteria operator="OR">
<criterion comment="XXXX is earlier than 1.2.3" test_ref="com.xxx:tst:20191992001"/>
<criteria operator="AND">
…
</definitions>

<tests>
…
<rpminfo_test check="at least one" comment="XXXX is earlier than 1.2.3" id="com.xxx:tst:20191992001" version="123">
<object object_ref="com.xxx:tst:20191992001"/>
<state state_ref="com.xxx:ste:20191992002"/>
</rpminfo_test>
…

<objects>
…
<rpminfo_object id="com.xxx:tst:20191992001" version="123">
<name>XXXX</name>
</rpminfo_object>

<states>
…
<rpminfo_state id="com.xxx:ste:20191992002" version="123">
 <evr datatype="evr_string" operation="less than">1.2.3</evr><
/rpminfo_state>
```

FIG.4

16B

FIRST MANAGEMENT INFORMATION

| TYPE | VALUE (FIRST FILE PATH INFORMATION, COMMAND) |
|---|---|
| FILE | /etc/xxx.conf |
| FILE | /etc/aaa.d/xxxx |
| | |
| | |
| | |

FIG.5

16C

SECOND MANAGEMENT INFORMATION

| FIRST FILE PATH INFORMATION | SECOND FILE PATH INFORMATION |
|---|---|
| /etc/xxx.conf | /backup/12345 |
| /etc/aaa.d/xxxx | /backup/12346 |
| | |
| | |
| | |

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2024-033169, filed on Mar. 5, 2024; the entire contents of which are incorporated herein by reference.

FIELD

Embodiments described herein relate generally to an information processing apparatus, an information processing method, and a computer program product.

BACKGROUND

New vulnerabilities are reported in large numbers daily. Effects when vulnerabilities in objects to be inspected, such as various systems using computers, are attacked are assessed on the basis of vulnerability information provided from vendors and the like.

In the effect assessment, occurrence conditions of vulnerabilities indicated in the provided vulnerability information are determined whether to be applicable to an object to be inspected, and, if applicable, assessment of a risk and the like are performed. Moreover, vulnerabilities in an object to be inspected are inspected by using a vulnerability inspection tool inspecting vulnerabilities in the object to be inspected by automatically performing determination of applicability of a huge number of pieces of the vulnerability information provided daily, and the like.

There is a case where the vulnerability inspection tool cannot directly access an object to be inspected because of delivery and the like of the object to be inspected. A method of generating a digital twin into which all information contained in the object to be inspected is copied and inspecting the digital twin by the vulnerability inspection tool has been known.

However, generation of the digital twin of each of a huge number of objects to be inspected is not practical because the volume of data stored is enormous. Therefore, with conventional techniques, it is difficult to properly assess effects when vulnerabilities in an object to be inspected are attacked in an environment where the object to be inspected cannot be accessed directly.

BRIEF DESCRIPTION OF THE DRAWINGS

FIG. 2A is a schematic diagram of a data configuration of vulnerability inspecting method information;

FIG. 2B is a schematic diagram of a data configuration of the vulnerability inspecting method information;

FIG. 3 is an explanatory diagram of a structure of OVAL;

FIG. 4 is a schematic diagram of a data configuration of first management information;

FIG. 5 is a schematic diagram of a data configuration of second management information;

DETAILED DESCRIPTION

According to one embodiment, an information processing apparatus includes a hardware processor connected to a memory. The hardware processor is configured to extract first file path information indicating a file path of a file used by a vulnerability inspection tool in vulnerability inspection of an object to be inspected. The file path is a file path in the object to be inspected. The hardware processor is configured to register second file path information and the first file path information in correlation with each other in second management information. The second file path information indicates a file path to a file copied from the object to be inspected by using the first file path information.

An information processing apparatus, an information processing method, and a computer program product according to embodiments of the present disclosure will be described in detail below with reference to the attached drawings.

Note that, in the following description of each embodiment, components denoted by the same reference sign have substantially the same function, and description of overlapping parts is omitted as appropriate.

First Embodiment

Figure 1:
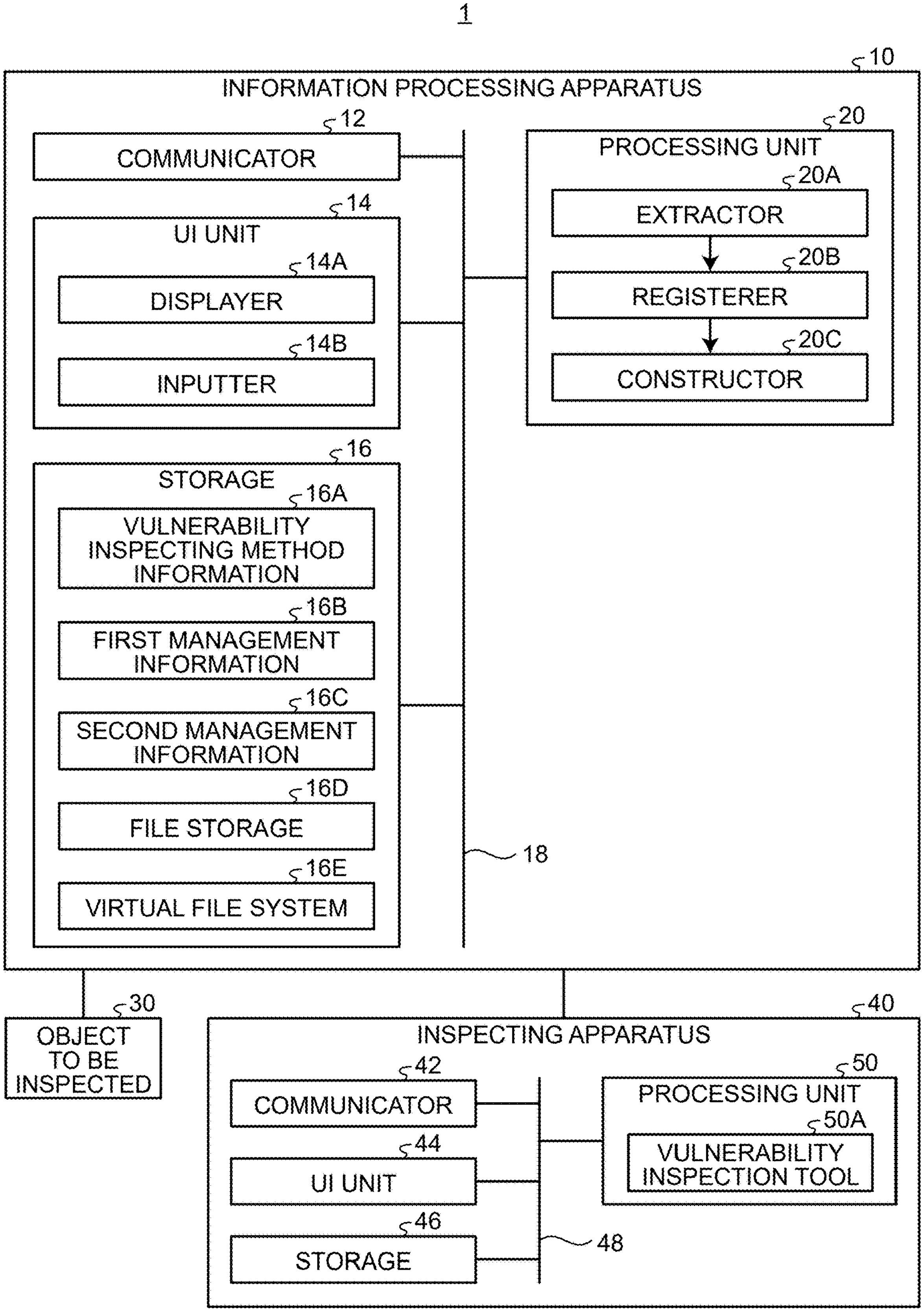
FIG. 1 is a functional block diagram of an information processing system.

FIG. 1 is a functional block diagram of an example information processing system 1 of the present embodiment.

The information processing system 1 includes an information processing apparatus 10, an object 30 to be inspected, and an inspecting apparatus 40. The information processing apparatus 10 and the object 30 to be inspected can be connected to each other while being communicable directly or via a network or the like. The information processing apparatus 10 and the inspecting apparatus 40 are connected to each other while being communicable directly or via a network or the like.

The object 30 to be inspected is a system being an object for assessment of a vulnerability. The object 30 to be inspected includes one or more computers. On the computer, software, such as an operating system (OS), open source software (OSS), and an application program or application software (App), is installed. The OS and OSS are, for example, but not limited to, Linux (registered trademark), Unix (registered trademark), Windows (registered trademark), Android (registered trademark), iOS (registered trademark), and the like. These pieces of software operate in such a manner as to use or include one or more software components. The software components may be referred to as a driver, a service, a library, and the like in some cases. For example, Linux operates in such a manner as to use or include the kernel functions of the OS itself and a large number of software components, such as device drivers and services.

The inspecting apparatus 40 is an information processing apparatus for executing vulnerability inspection of the object 30 to be inspected.

The inspecting apparatus 40 includes a communicator 42, a user interface (UI) unit 44, a storage 46, and a processing unit 50. The communicator 42, UI unit 44, and storage 46, and the processing unit 50 are connected to each other while being communicable via a bus 48 or the like.

The communicator 42 communicates with the information processing apparatus 10 directly or via the network or the like. The UI unit 44 has a display function of displaying various pieces of information and an input function of receiving an operation instruction from a user. The display function is a display displaying various pieces of information. The input function is, for example, a pointing device, such as a mouse, a keyboard, and the like. The storage 46 stores various pieces of information.

The processing unit 50 executes information processing in the inspecting apparatus 40. The processing unit 50 includes a vulnerability inspection tool 50A. The vulnerability inspection tool 50A is implemented by one or more processors. In one example, the vulnerability inspection tool 50A may be implemented by execution of a computer program by a processor, such as a central processing unit (CPU), namely, implemented by software. Alternatively, the vulnerability inspection tool 50A may be implemented by a dedicated processor, such as an IC, namely, implemented by hardware. Alternatively, the vulnerability inspection tool 50A may be implemented by a combination of software and hardware. The vulnerability inspection tool 50A may be installed in the information processing apparatus 10.

The vulnerability inspection tool 50A is a tool that executes vulnerability inspection of the object 30 to be inspected on the basis of vulnerability information.

The vulnerability information is information indicating a vulnerability. The vulnerability information includes information relating to the vulnerability. To be specific, for example, the vulnerability information includes information indicating applicability conditions to be applied to the vulnerability, an assessment criterion including a risk value for each of the applicability conditions, ranges of effects of the vulnerability assumed to be on the object 30 to be inspected, countermeasures for counteracting the vulnerability, and the like. The vulnerability information is provided by Common Vulnerabilities and Exposures (CVE), National Vulnerability Database (NVD), Japan Vulnerability Notes (JVN), and the like.

Content of the vulnerability information is provided not only in regular text but also in a security inspection language so as to be machine-processible. In the present embodiment, a form in which the vulnerability information is written in Open Vulnerability and Assessment Language (OVAL) being an example security inspection language is described as an example.

The vulnerability inspection tool 50A executes applicability determination whether the applicability condition in the vulnerability information is applicable to the object 30 to be inspected, if applicable, assesses a risk, and, in the case of a high risk, applies a patch provided by a software vendor or the like or implements a workaround or the like. Through these pieces of processing, the vulnerability inspection tool 50A executes the vulnerability inspection of the object 30 to be inspected.

The vulnerability applicability determination uses not only package information of the installed software included in the object 30 to be inspected but also content of a file, such as a configuration file. With a security inspection language, such as OVAL, the applicability condition can be written with a file path and a value. If being capable of directly accessing the object 30 to be inspected, the vulnerability inspection tool 50A checks the package information and the file content in the object 30 to be inspected to perform the vulnerability applicability determination. Examples of the vulnerability inspection tool 50A include Vulnerability Scanner (Vuls) and the like.

The information processing apparatus 10 includes a communicator 12, a UI unit 14, a storage 16, and a processing unit 20. The communicator 12, a UI unit 14, and storage 16, and the processing unit 20 are connected to each other while being communicable via a bus 18 or the like.

The communicator 12 communicates with each of the object 30 to be inspected and the inspecting apparatus 40 directly or via the network or the like. The UI unit 14 includes a displayer 14A and an inputter 14B. The displayer 14A is a display displaying various pieces of information. The inputter 14B receives an operation instruction from the user. The inputter 14B is, for example, a pointing device, such as a mouse, a keyboard, and the like. The storage 16 stores various pieces of information. The storage 16 may be a storage apparatus disposed external to the information processing apparatus 10. In one example, the storage 16 may be installed in an external information processing apparatus connected to the information processing apparatus 10 via a network or the like.

In the present, the storage 16 stores various pieces of information of vulnerability inspecting method information 16A, first management information 16B, second management information 16C, a file storage 16D, a virtual file system 16E, and the like. Details of these pieces of information will be described later.

The processing unit 20 includes an extractor 20A, a registerer 20B, and a constructor 20C. The extractor 20A, the registerer 20B, and the constructor 20C are implemented by, for example, one or more processors. In one example, each of the above components may be implemented by execution of a computer program by a processor, such as a central processing unit (CPU), namely, implemented by software. Each of the above components may be implemented by a dedicated processor, such as an IC, namely, implemented by hardware. Each of the above components may be implemented by a combination of software and hardware. If multiple processors are used, each processor may implement one of the components or two or more of the components. Moreover, such a configuration may be made that at least one of the above components is disposed in an external information processing apparatus connected to the information processing apparatus 10 via a network.

As described above, if the vulnerability inspection tool 50A can directly access the object 30 to be inspected, the vulnerability inspection tool 50A checks the package information and the file content in the object 30 to be inspected to perform the vulnerability applicability determination. However, if the vulnerability inspection tool 50A is in such an environment where the object 30 to be inspected cannot be accessed directly because of delivery or the like of the object 30 to be inspected, the vulnerability inspection tool 50A cannot directly inspect the object 30 to be inspected. There is a method of generating a digital twin into which all information contained in the object 30 to be inspected is copied and detecting a vulnerability by the vulnerability inspection tool 50A on the digital twin. However, generation of a digital twin of each of a huge number of the objects 30 to be inspected is not practical because the volume of data stored is enormous. With conventional techniques, it is difficult to properly assess effects when a vulnerability in the object 30 to be inspected is attacked in an environment where the vulnerability inspection tool 50A cannot directly access the object 30 to be inspected.

Considering the above, the processing unit 20 of the present includes at least the extractor 20A and the registerer 20B. The processing unit 20 may have a configuration further including the constructor 20C.

The extractor 20A extracts first file path information indicating a file path of a file used in the vulnerability inspection of the object 30 to be inspected by the vulnerability inspection tool 50A. The file path is information indicating the location and stored place of a specific file in a computer.

The first file path information is information indicating the file path in the object 30 to be inspected, to a file used in the vulnerability inspection of the object 30 to be inspected.

The extractor 20A extracts the first file path information on the basis of the vulnerability inspecting method information 16A.

The vulnerability inspecting method information 16A is information defining a method of inspecting a vulnerability in the object 30 to be inspected by the vulnerability inspection tool 50A. The vulnerability inspecting method information 16A is written in the same security inspection language as the vulnerability information. Similar to the vulnerability information, the present is described on the assumption of a form in which the vulnerability inspecting method information 16A is written in OVAL.

FIGS. 2A and 2B are schematic diagrams of an example data configuration of the vulnerability inspecting method information 16A.

FIGS. 2A and 2B illustrate an example form in which the vulnerability inspecting method information 16A is composed of vulnerability inspecting method information 16A1 illustrated in FIG. 2A and vulnerability inspecting method information 16A2 illustrated in FIG. 2B. FIGS. 2A and 2B illustrate an example form in which the vulnerability inspecting method information 16A is an OVAL file written in Extensible Markup Language (XML). Note that an actual OVAL file contains XML namespace information, which is omitted in the example illustrated in FIGS. 2A and 2B because it would be complicated.

The vulnerability inspecting method information 16A contains OVAL file information, the vulnerability information, a test definition, a test object, and a test object state.

The OVAL file information is bibliographic information of the vulnerability inspecting method information 16A. The test definition is information indicating the definition of the vulnerability inspection. The test object is information indicating an object, such as the file used in the vulnerability inspection. The test object state is information indicating a state to be satisfied of the file or the like used in the vulnerability inspection.

To be specific, for example, the vulnerability inspecting method information 16A contains the following elements at the lower level of "oval_definitions" being the root element of the OVAL file.

- generator: This represents bibliographic information of the vulnerability inspecting method information 16A and corresponds to the above OVAL file information. The bibliographic information indicates, for example, the title, version, creation date, and the like.
- definitions: This represents a set of the vulnerability information. Directly below definitions, there are a plurality of definition elements representing individual pieces of the vulnerability information.
- tests: This represents a set of inspection conditions describing the applicability conditions of the vulnerability information. Directly below tests, there are elements describing individual inspection conditions. The set of the inspection conditions indicates the test definition.
- objects: This represents a set of objects for the inspection conditions. Directly below objects, there are elements describing individual objects.
- states: This represents a set of conditions (values) to be satisfied by the test object. Directly below states, there are elements describing individual conditions. The set of the conditions indicates the test object state.

The definition element corresponds to a single piece of the vulnerability information and is composed of a metadata element representing content of the vulnerability information, such as description of the vulnerability and the risk severity, and a criteria element representing the applicability condition of the vulnerability. The vulnerability applicability condition is expressed as a logical expression of a plurality of conditions, and the logical expression is expressed with a criterion element representing an individual condition and an operator attribute value (for example, "AND") in the criteria element at the upper level. In the criterion element, there is a test_ref attribute. The test_ref attribute points to the element having an ID being the attribute value of test_ref among the elements directly below the tests element.

The element (for example, "textfilecontent54_test") below the tests element has an object element representing the test object and a state element representing the condition to be satisfied by that object. In the object element, there is an object_ref attribute. The object_ref attribute points to the element having an ID being the attribute value of object_ref among the elements directly below the objects element. In the state element, there is a state_ref attribute. The state_ref attribute points to the element having an ID being the attribute value of states_ref among the elements directly below the states element (See FIG. 3). FIG. 3 is an explanatory diagram of an example structure of OVAL. FIG. 3 illustrates example relationships of the above-described elements having IDs being the attribute values. Returning to FIGS. 2A and 2B, the description will be continued.

The test conditions are defined by the element names of the elements below the tests element. Examples are described below.

- rpminfo_test: This represents that whether the Linux software package management system rpm contains software being the object is tested. The object element indicates the package name, and the state element describes the condition relating to the software version.
- textfilecontent54_test: This represents that whether a designated file contains a specific character string is tested. The object element identifies the file, and the state element specifies the condition of the character string contained in the file.
- xinetd_test: This represents that the configuration file of xinetd configuring a network is checked and content of the configuration is tested. The object element specifies the name of a configuration item, and the state element specifies the condition to be satisfied by the configuration value.

Returning to FIG. 1, the description will be continued.

The extractor 20A extracts the first file path information indicating the file path, which is included in the object 30 to be inspected, of the file that is contained in the object 30 to be inspected and that is used in the vulnerability inspection of the object 30 to be inspected by the vulnerability inspection tool 50A, on the basis of the vulnerability inspecting method information 16A. Thus, the extractor 20A reads the vulnerability inspecting method information 16A, acquires the individual vulnerability applicability conditions for each piece of the vulnerability information defined by the vulnerability inspecting method information 16A, and reads the element value for each applicability condition from the vulnerability inspecting method information 16A. Through this reading processing, the extractor 20A extracts the file path, in the object 30 to be inspected, of the file that is contained in the object 30 to be inspected and that is used in the vulnerability inspection by the vulnerability inspection tool 50A, as the first file path information.

To be specific, for example, the extractor 20A reads the vulnerability inspecting method information 16A and acquires one definition element contained in the vulnerability inspecting method information 16A to acquire a single piece of the vulnerability information. Then, each time a single piece of the vulnerability information is acquired, the extractor 20A acquires the applicability condition indicated by that vulnerability information. In one example, the extractor 20A acquires the criteria element directly below the definition element to acquire an applicability condition.

Then, each time one criteria element is acquired to acquire one applicability condition, the extractor 20A extracts the element, having the same ID as the attribute of test_ref contained in the applicability condition, directly below the tests element.

It is assumed that the element name of an extracted element is "textfilecontent54_test" being the element name representing the element representing the test object and the condition to be satisfied by that object. In this case, the extractor 20A extracts the element that is directly below the object element representing the test object contained in the element "textfilecontent54_test" having that element name and of which the ID coincides with the attribute value of object_ref. Then, the extractor 20A extracts the value of the "filepath" element contained in the extracted element as the first file path information.

If the element name of an extracted element is "xinetd_test" being the element name representing that the configuration file of xinetd configuring a network is checked and content of the configuration is tested, the extractor 20A extracts the same file path (for example, "/etc/xinted.conf") as the first file path information irrespective of the object element.

Then, the extractor 20A registers the extracted first file path information in the first management information 16B.

FIG. 4 is a schematic diagram of an example data configuration of the first management information 16B. The first management information 16B has a plurality of records in which types and values are correlated with each other.

The extractor 20A registers the extracted first file path information and the type of the file stored in the location indicated by the file path indicated by the first file path information in correlation with each other. Thus, the extractor 20A registers the first file path information being the file path, in the object 30 to be inspected, of the file in the object 30 to be inspected used in the vulnerability inspection in the "Value" field in the first management information 16B and registers "File" in the "Type" field corresponding to the "Value". The first management information 16B may further store a record in which "Command" in the "Type" field and "a command required for vulnerability inspection" in the "Value" field corresponding to the "Command" are correlated (See details below).

Returning to FIG. 1, the description will be continued.

The registerer 20B registers second file path information indicating a file path to a file that is copied from the object 30 to be inspected by using the first file path information and the first file path information in correlation with each other, in the second management information 16C.

To describe in detail, the registerer 20B stores, in the file storage 16D (an example of a file storage area), the file that is copied from the object 30 to be inspected by using the first file path information. Thus, the registerer 20B uses the first file path information registered in the first management information 16B to read the file stored in the location indicated by the file path, in the object 30 to be inspected, indicated by the first file path information and copies the file into the file storage 16D.

Then, the registerer 20B registers the second file path information indicating the file path to the file copied into the file storage 16D and the first file path information used in copying the file from the object 30 to be inspected in correlation with each other, in the second management information 16C.

FIG. 5 is a schematic diagram of an example data configuration of the second management information 16C. As illustrated in FIG. 5, the second management information 16C is information in which the first file path information and the second file path information are correlated with each other. In the second management information 16C, the first file path information registered in the first management information 16B is registered, and the second file path information of the file copied into the file storage 16D by the registerer 20B is registered in correlation. Thus, in the second management information 16C, for the same file, the first file path information indicating the file path in the object 30 to be inspected and the second file path information indicating the file path in the file storage 16D are registered in correlation with each other.

Returning to FIG. 1, the description will be continued. Next, the constructor 20C will be described. The processing unit 20 may have a configuration including or not including the constructor 20C. In the present, a form in which the processing unit 20 includes the constructor 20C is described as an example.

The constructor 20C constructs the virtual file system 16E in which the first file path information registered in the second management information 16C and the file stored in the location indicated by the file path indicated by the second file path information correlated with that first file path information in the second management information 16C are correlated with each other.

The vulnerability inspection tool 50A uses the file stored in the location indicated by the file path indicated by the first file path information indicated in the vulnerability information written in OVAL, for example, to execute assessment of effects when a vulnerability in the object 30 to be inspected is attacked.

In the present, the vulnerability inspection tool 50A accesses the file by using the second management information 16C and executes the vulnerability inspection. To describe in detail, in the applicability determination of a vulnerability indicated in the vulnerability information, instead of the location in the object 30 to be inspected indicated by the file path in the object 30 to be inspected indicated by the first file path information, the vulnerability inspection tool 50A uses the file stored in the location in the file storage 16D indicated by the file path indicated by the second file path information correlated with that first file path information in the second management information 16C.

Therefore, even in an environment where the vulnerability inspection tool 50A cannot directly access the object 30 to be inspected, the information processing apparatus 10 of the present can properly assess effects when a vulnerability in the object 30 to be inspected is attacked.

Note that some vulnerability inspection tools 50A may have such a configuration that it is difficult to access the file stored in the location in the file storage 16D indicated by the file path indicated by the second file path information correlated with the first file path information in the second management information 16C.

However, as described above, in the information processing apparatus 10, the constructor 20C constructs the virtual file system 16E.

Thus, even if it is difficult for the vulnerability inspection tool 50A to access the file stored in the file storage 16D, the file correlated with the first file path information in the virtual file system 16E can be utilized, enabling proper assessment of effects when a vulnerability in the object 30 to be inspected is attacked.

Note that the extracting processing of the first file path information at the extractor 20A, the registering processing of registering the first file path information and the second file path information in correlation with each other in the second management information 16C at the registerer 20B, the constructing processing of the virtual file system 16E at the constructor 20C, and the vulnerability inspection at the vulnerability inspection tool 50A are not required to perform consecutively in this order, and each piece of the processing may be performed at a necessary timing.

In one example, the extractor 20A may execute the above-described extracting processing when the vulnerability information is updated or when new vulnerability information is reported. The registerer 20B may execute the above-described registering processing when the first management information 16B is updated or at the time of update or the like of the object 30 to be inspected. The vulnerability inspection tool 50A may execute the above-described vulnerability inspection by using the second management information 16C or the virtual file system 16E when the user gives an instruction of inspection execution through an operation instruction or the like on the UI unit 44.

Next, an example of a procedure of information processing executed by the information processing apparatus 10 of the present will be described.

Figure 6:
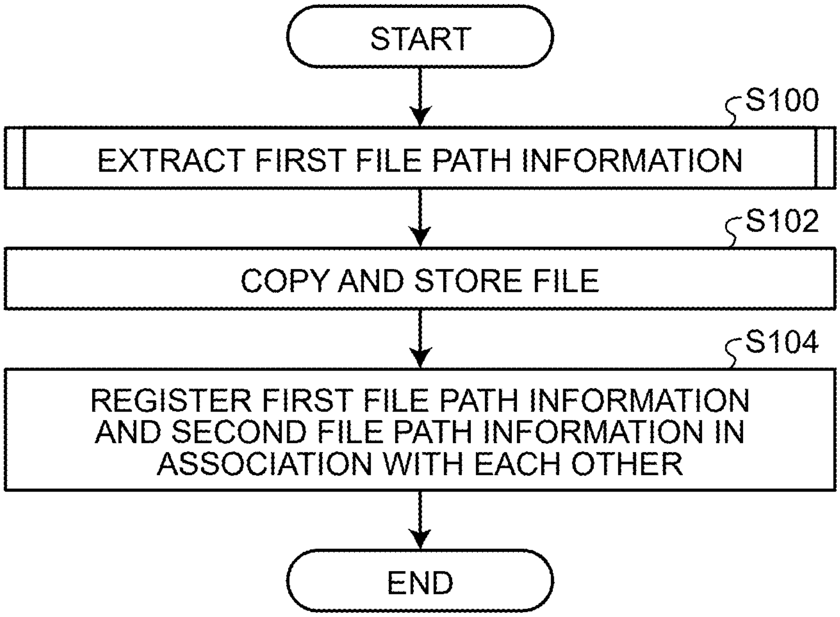
FIG. 6 is a flowchart of a procedure of information processing executed by an information processing apparatus.

FIG. 6 is a flowchart illustrating an example of a procedure of information processing executed by the information processing apparatus 10 of the present.

The extractor 20A executes the extracting processing of extracting the first file path information indicating the file path of the file used in the vulnerability inspection of the object 30 to be inspected by the vulnerability inspection tool 50A (Step S100).

The registerer 20B uses the first file path information extracted at Step S100 and registered in the first management information 16B to copy and store the file from the object 30 to be inspected into the file storage 16D (Step S102).

The registerer 20B registers the second file path information indicating the file path to the file stored in the file storage 16D at Step S102 and the first file path information used in copying the file from the object 30 to be inspected in correlation with each other, in the second management information 16C (Step S104). This routine then ends.

Next, a specific example of details of a procedure of the extracting processing at the extractor 20A will be described.

Figure 7:
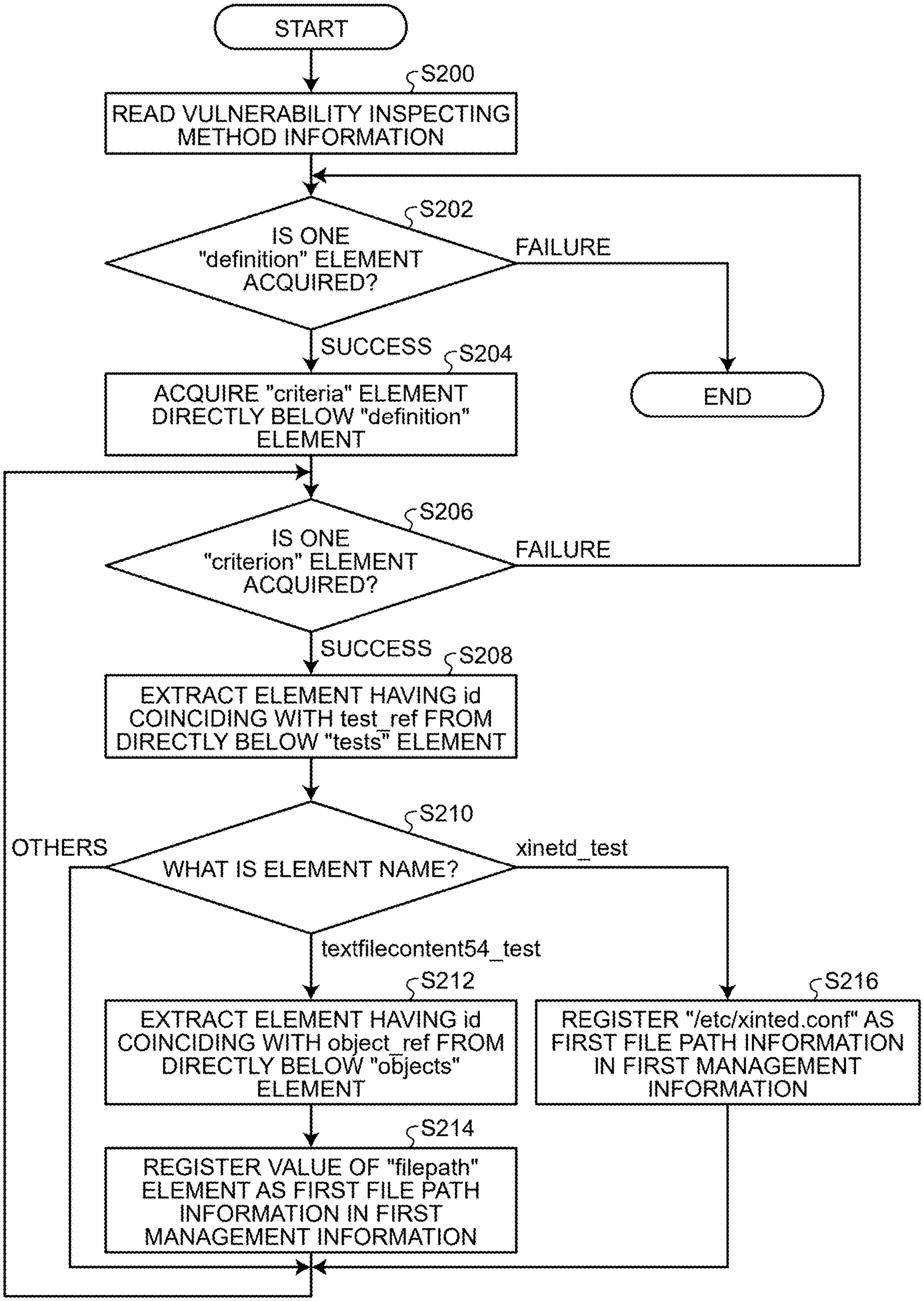
FIG. 7 is a flowchart of a procedure of extracting processing at an extractor.

FIG. 7 is a flowchart illustrating an example of a procedure of the extracting processing at the extractor 20A. FIG. 7 is a flowchart of an example of a procedure of detailed processing at Step S100 in FIG. 6. FIG. 7 illustrates an example in which the extractor 20A uses the vulnerability inspecting method information 16A illustrated in FIGS. 2A and 2B to execute the extracting processing of extracting the first file path information.

First, the extractor 20A reads multiple pieces of the vulnerability information recorded in the vulnerability inspecting method information 16A and written in OVAL to parse XML (Step S200). The extractor 20A may perform the processing at Step S200 by using the vulnerability information actually used by the vulnerability inspection tool 50A or may perform the processing at Step S200 by using the latest vulnerability information published in the OVAL repository.

Then, the extractor 20A acquires one unprocessed "definition" element among the plural pieces of the vulnerability information read at Step S200 (Step S202). There are the "definition" elements in the vulnerability inspecting method information 16A read at Step S200. Thus, if the extractor 20A can acquire no unprocessed "definition" element, namely, if processing (or acquisition) of all the "definition" elements contained in the vulnerability inspecting method information 16A read at Step S200 is completed (Failure at Step S202), this routine ends.

If acquiring one unprocessed "definition" element (Success at Step S202), the extractor 20A proceeds to Step S204. At Step S204, the extractor 20A acquires the "criteria" element directly below the "definition" element acquired at Step S202 (Step S204). Then, the extractor 20A acquires one unprocessed "criterion" element directly below the "criteria" element acquired at Step S204 (Success at Step S206) and proceeds to Step S208. If all the "criterion" elements directly below the "criteria" element acquired at Step S204 are processed, namely, if no unprocessed "criterion" element can be acquired (Failure at Step S206), the extractor 20A returns to Step S202.

At Step S208, the extractor 20A checks the value (for example, com.xxx:tst:20191992001) of the "test_ref" attribute in the "criterion" element and retrieves an element having the same value of the "id" attribute value as the "test_ref" attribute value among the elements directly below the "tests" element (Step S208).

At Step 210, the extractor 20A checks the element name of the element retrieved at Step S208 and, if the element name is "textfilecontent54_test", proceeds to Step S212. If the element name is "xinetd_test", the extractor 20A proceeds to Step S216. If the element name is other than these, the extractor 20A proceeds to Step S206.

Note that the flowchart illustrated in FIG. 7 illustrates an example form in which, in the case of the element name "textfilecontent54_test" and the element name "xinetd_test", the extractor 20A extracts the first file path information; however, expansion to another test item dealing with a file is possible.

At Step S212, the extractor 20A retrieves an element having the same value of the "id" attribute value as the "object_ref" attribute value in the element having the element name "textfilecontent54_test", from directly below the "objects" element (Step S212). Then, the extractor 20A regards the value of the "filepath" element directly below the element retrieved at Step S212 as the first file path information and registers the first file path information in correlation with the type "File" in the first management information 16B (Step S214). Then, the extractor 20A proceeds to Step S206 described above.

On the other hand, at Step S216, the extractor 20A regards the file path "/etc/xinted.conf" as the first file path information and registers the first file path information in correlation with the type "File" in the first management information 16B (Step S216). In the case of a test for the element name "xinetd_test", the configuration file to be referenced is determined to be "/etc/xinted.conf". Therefore, at Step S216, the extractor 20A registers this file path in the first management information 16B as the first file path information irrespective of the object element.

Example operation of the example configured as described above will be described with one example.

It is assumed that a situation where the vulnerability inspecting method information 16A1 and vulnerability inspecting method information 16A2 illustrated in FIGS. 2A and 2B are stored in the storage 16 as the vulnerability inspecting method information 16A.

In this case, as described with the flowchart in FIG. 7, the extractor 20A first extracts the file path of the file used in the vulnerability inspection as the first file path information. To describe in detail, the extractor 20A executes parsing of the vulnerability inspecting method information 16A illustrated in FIGS. 2A and 2B in the processing at Step S200.

Then, the extractor 20A extracts the "definition" element indicated in the lines with line numbers 10 to 27 in the vulnerability inspecting method information 16A at Step S202 (corresponding to Success at Step S202). The numeric value added to the left end, in FIGS. 2A and 2B, of each line composing the vulnerability inspecting method information 16A illustrated in FIGS. 2A and 2B indicates a line number.

Then, the extractor 20A proceeds to Step S204 to extract the "criteria" element indicated in the lines with line numbers 23 to 27 in the vulnerability inspecting method information 16A and further extracts the "criterion" element (See line number 24) in that element (Step S206).

Here, as illustrated in FIGS. 2A and 2B, the value of the "test_ref" attribute in the extracted "criterion" element is "com.xxx:tst:20191992001". Thus, the extractor 20A retrieves an element having the "id" attribute "com.xxx:tst:20191992001" from among the elements contained in the "tests" element (See the lines with line numbers 29 to 38 in the vulnerability inspecting method information 16A) and extracts the "rpminfo_test" element in the lines with line numbers 30 to 33 in the vulnerability inspecting method information 16A (Step S212).

At Step S210, since the element name is "rpminfo_test", the extractor 20A determines that it is "Others" at Step S210 and proceeds to Step S206.

At Step S206, the extractor 20A extracts the "criterion" element in the line with line number 26 in the vulnerability inspecting method information 16A. Then, at Step S208, the extractor 20A retrieves an element having the "id" attribute "com.xxx:tst:20191992003" being the value of the "test_ref" attribute in that element. This retrieval processing allows the extractor 20A to extract the "textfilecontent54_test" element in the lines with line numbers 34 to 37 in the vulnerability inspecting method information 16A (Step S208).

Then, since the element name is "textfilecontent54_test", the extractor 20A determines that it is "textfilecontent54_test" at Step S210 and proceeds to Step S212. Then, the extractor 20A retrieves an element having the "id" attribute value being the value "com.xxx:obj20191992003" of the "object_ref" attribute in the "textfilecontent54_test" element from the elements directly below the "objects" attribute (See the lines with line numbers 39 to 48 in the vulnerability inspecting method information 16A). The extractor 20A extracts the "textfilecontent54_object" element in the lines with line numbers 43 to 47 in the vulnerability inspecting method information 16A (Step S212). Then, the extractor 20A registers "File" in the type field and "/etc/xxx-module.conf" being the value of the "filepath" element below the "textfilecontent54_object" element in the value field in the first management information 16B as the first file path information (Step S214). Then, the extractor 20A returns to Step S206.

Then, at Step S206, there is no unprocessed "criterion" element, so that the extractor 20A proceeds to Step S202. There is also no unacquired "definition" element, so that the processing ends.

At this point, there is only the record "/etc/xxx-module.conf" in the vulnerability inspecting method information 16A.

Next, the registerer 20B reads the first file path information "/etc/xxx-module.conf" being the value corresponding to the type "File" from the vulnerability inspecting method information 16A and copies data stored in the location in the object 30 to be inspected indicated by the file path indicated by that first file path information into the file storage 16D. At this time, the registerer 20B names the file as, for example, a sequence number or the like so that the file names of the files stored in the file storage 16D are unique, and stores it in the file storage 16D. In this example, a case where the registerer 20B names the file as "12345" is described. Then, the registerer 20B additionally registers a record in which the first file path information "/etc/xxx-module.conf" and the second file path information "/backup/12345" being the copy destination are correlated with each other in the second management information 16C.

At the time of the vulnerability inspection of the object 30 to be inspected, the vulnerability inspection tool 50A searches the second management information 16C and, if the second file path information is correlated with the first file path information being the file path to be accessed, references the file stored in the location indicated by the file path indicated by that second file path information. In this example, if accessing "/etc/xxx-module.conf", the vulnerability inspection tool 50A uses "/backup/12345" instead.

Thus, the vulnerability inspection tool 50A can properly assess effects when a vulnerability in the object 30 to be inspected is attacked, without directly accessing the object 30 to be inspected.

As described above, the information processing apparatus 10 of the present includes the extractor 20A and the registerer 20B. The extractor 20A extracts the first file path information indicating the file path, in the object 30 to be inspected, of the file used in the vulnerability inspection of the object 30 to be inspected by the vulnerability inspection tool 50A. The registerer 20B registers the second file path information indicating the file path to the file copied from the object 30 to be inspected using the first file path information and the first file path information in correlation with each other, in the second management information 16C.

In this way, in the information processing apparatus 10 of the present, the registerer 20B generates the second management information 16C. Thus, the vulnerability inspection tool 50A accesses the file by using the second management information 16C and executes the vulnerability inspection. To describe in detail, in the applicability determination of a vulnerability indicated in the vulnerability information, instead of the location in the object 30 to be inspected indicated by the file path in the object 30 to be inspected indicated by the first file path information, the vulnerability inspection tool 50A uses the file stored in the location in the file storage 16D indicated by the file path indicated by the second file path information correlated with that first file path information in the second management information 16C.

Thus, even in an environment where the vulnerability inspection tool 50A cannot directly access the object 30 to be inspected, the information processing apparatus 10 of the present can properly assess effects when a vulnerability in the object 30 to be inspected is attacked.

Thus, even in an environment where the object 30 to be inspected cannot be accessed directly, the information processing apparatus 10 of the present can properly assess effects when the vulnerability in the object 30 to be inspected is attacked.

Note that, in the above-described embodiment, a form in which the path of a file manipulated by a test item that manipulates a file is recorded in the first management information 16B as the first file path information at Steps S212 and S214 has been described. However, in vulnerability inspection, there is a case where a command is executed on the object 30 to be inspected and its output result is used instead of content of a file. In this case, by making a modification as below, such vulnerability inspection can also be handled. As an example of this vulnerability inspection, a case of "uname_test" will be described.

"uname_test" executes the command "uname" outputting kernel information and performs vulnerability inspection by using its output. At Step S208, if the element name is "uname_test", the extractor 20A adds a record in which "Command" in the type field in the first management information 16B and "uname" in the value field are correlated with each other.

Then, the registerer 20B changes operation depending on the type registered in the first management information 16B. If the type is "File", the registerer 20B copies the file from the object 30 to be inspected in the same way as the above-described example. If the type is "Command", the registerer 20B executes the command being the value in the "Value" field in the first management information 16B on the object 30 to be inspected and stores the result in the file storage 16D as a file.

Second Embodiment

In the present embodiment, first file path information is extracted by using an access log of a vulnerability inspection tool.

Figure 8:
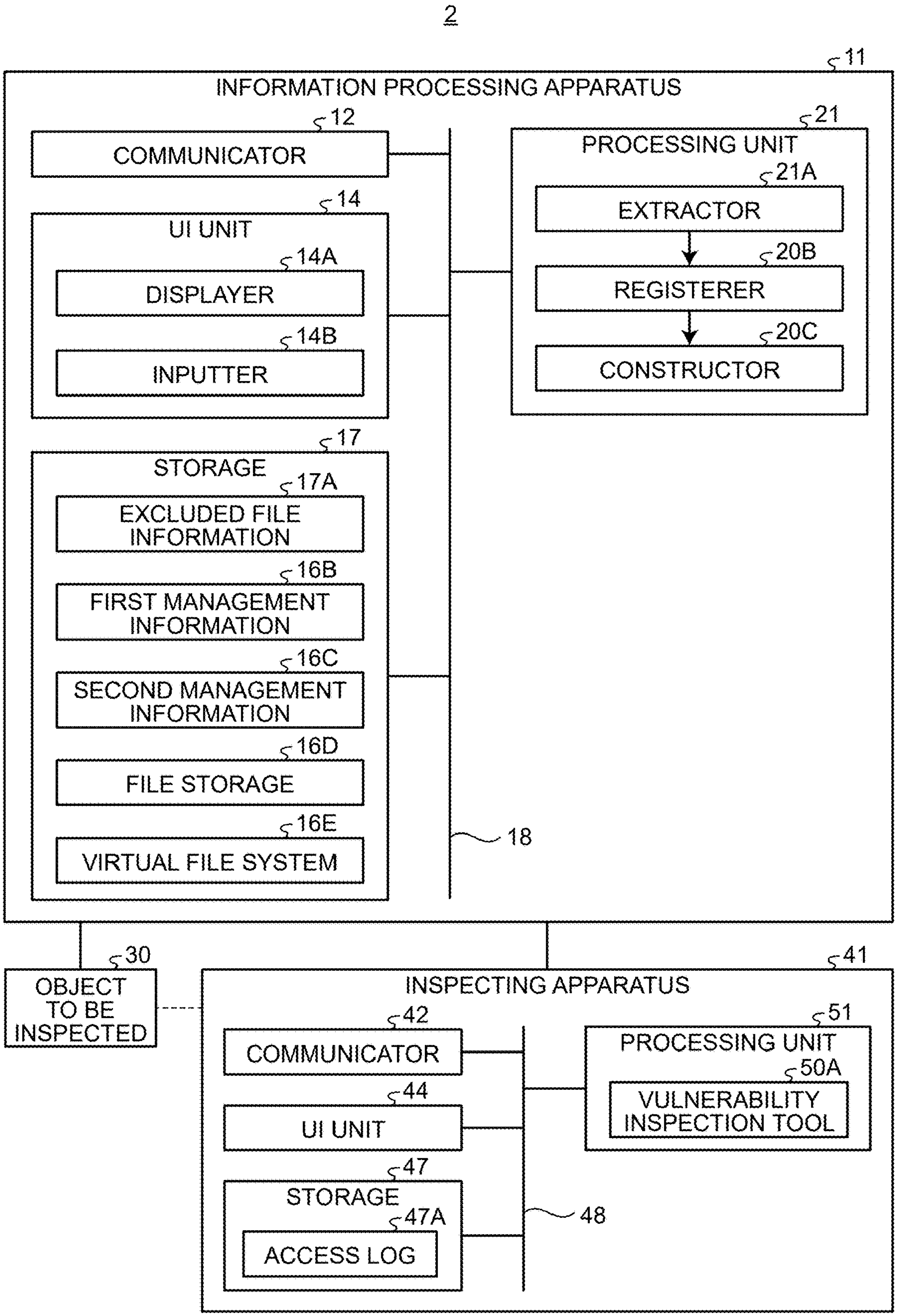
FIG. 8 is a functional block diagram of an information processing system.

FIG. 8 is a functional block diagram of an example information processing system 2 of the present.

The information processing system 2 includes an information processing apparatus 11, an object 30 to be inspected, and an inspecting apparatus 41. The information processing apparatus 11 and the object 30 to be inspected can be connected to each other while being communicable directly or via a network or the like. The information processing apparatus 11 and the inspecting apparatus 41 are connected to each other while being communicable directly or via a network or the like. The object 30 to be inspected and the inspecting apparatus 41 are connected to each other while being communicable at the time of generation of an access log, which will be described later, but may not be connected to each other after generation of the access log. The object 30 to be inspected is similar to that in the above-described embodiment.

The inspecting apparatus 41 is an information processing apparatus for executing vulnerability inspection of the object 30 to be inspected. The inspecting apparatus 41 includes a communicator 42, a UI unit 44, a storage 47, and a processing unit 51. The communicator 42, UI unit 44, and storage 47, and the processing unit 51 are connected to each other while being communicable via a bus 48 or the like. The inspecting apparatus 41 is similar to the inspecting apparatus 40 in the above-described embodiment, except that the inspecting apparatus 41 includes the storage 47 instead of the storage 46 and the processing unit 51 instead of the processing unit 50.

The storage 47 stores various pieces of information. In the present, the storage 47 stores an access log 47A. The access log 47A will be described in detail later.

The processing unit 51 executes information processing in the inspecting apparatus 41. The processing unit 51 includes a vulnerability inspection tool 50A.

If the vulnerability inspection tool 50A can directly access the object 30 to be inspected, the processing unit 51 starts the vulnerability inspection tool 50A and causes the vulnerability inspection tool 50A to execute vulnerability inspection of the object 30 to be inspected. Then, the processing unit 51 uses information of a file accessed when the vulnerability inspection tool 50A executes the vulnerability inspection of the object 30 to be inspected to generate the access log 47A. The access log 47A is information containing the file path of a file accessed when the vulnerability inspection tool 50A executes the vulnerability inspection of the object 30 to be inspected.

The processing unit 51 generates an access log generated by the vulnerability inspection tool 50A as the access log 47A. There is a case where the vulnerability inspection tool 50A does not have a function to generate an access log. In this case, the processing unit 51 may generate the access log 47A by using an audit log of the OS when the vulnerability inspection tool 50A executes the vulnerability inspection of the object 30 to be inspected. Alternatively, the processing unit 51 may generate the access log 47A by creating a module monitoring file access, such as Linux Security Module, and acquiring information of a file accessed by the vulnerability inspection tool 50A. The processing unit 51 stores the generated access log 47A in the storage 47. Note that the processing unit 51 may transmit the generated access log 47A to the information processing apparatus 11. In this case, the information processing apparatus 11 may store the access log 47A received from the inspecting apparatus 41 in a storage 17. The information processing apparatus 11 will be described.

The information processing apparatus 11 includes a communicator 12, a UI unit 14, the storage 17, and a processing unit 21. The information processing apparatus 11 is similar to the information processing apparatus 10, except that the information processing apparatus 11 includes the storage 17 and the processing unit 21 instead of the storage 16 and the processing unit 20.

The storage 17 is similar to the storage 16, except that the storage 16 stores excluded file information 17A instead of the vulnerability inspecting method information 16A. The processing unit 21 is similar to the processing unit 20, except that the processing unit 21 includes an extractor 21A instead of the extractor 20A.

The extractor 21A extracts first file path information on the basis of the access log 47A and the excluded file information 17A.

The excluded file information 17A is information in which file information relating to a file not used in the vulnerability inspection among files identified by the file paths registered in the access log 47A is preliminarily recorded. In the excluded file information 17A, the file information of a general file not used in the vulnerability inspection should be preliminarily recorded by the processing unit 21, an external apparatus, or the like. In one example, if the vulnerability inspection tool 50A is a tool creating a log file, the log file itself is not used in the vulnerability inspection. Thus, the processing unit 21 should preliminarily record information indicating the log file itself in the excluded file information 17A.

The extractor 21A extracts a file path to access a file other than the file defined by the excluded file information 17A among the file paths recorded in the access log 47A, as the first file path information.

Then, the extractor 21A registers the extracted first file path information and the type of the file stored in the location indicated by the file path identified by the first file path information in correlation with each other, in the first management information 16B.

The registerer 20B and the constructor 20C are similar to those in the above-described embodiment.

Next, an example of a procedure of information processing executed by the information processing apparatus 11 of the present will be described.

Figure 9:
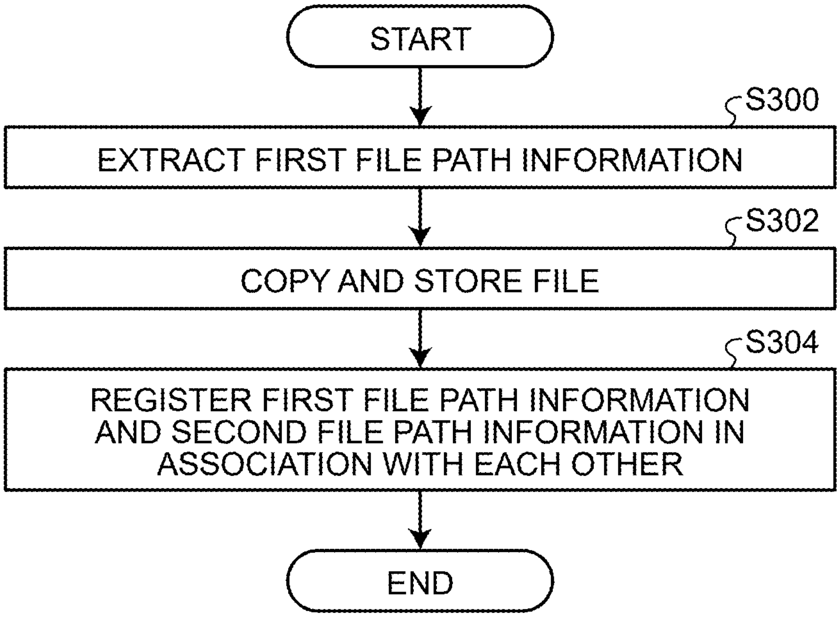
FIG. 9 is a flowchart of a procedure of information processing executed by an information processing apparatus.

FIG. 9 is a flowchart illustrating an example of a procedure of information processing executed by the information processing apparatus 11 of the present.

The extractor 21A extracts the first file path information on the basis of the access log 47A and the excluded file information 17A (Step S300).

The registerer 20B uses the first file path information extracted at Step S300 and registered in the first management information 16B to copy and store the file from the object 30 to be inspected into the file storage 16D (Step S302).

Then, the registerer 20B registers second file path information indicating the file path to the file stored at Step S302 in the file storage 16D and the first file path information used in copying the file from the object 30 to be inspected in correlation with each other, in the second management information 16C (Step S304). This routine then ends.

As described above, in the present, the extractor 21A extracts the first file path information on the basis of the access log 47A and the excluded file information 17A.

In the above-described embodiment, the extractor 20A extracts the first file path information being the file path, in the object 30 to be inspected, of the file necessary for the vulnerability inspection from the vulnerability inspecting method information 16A. In this case, the vulnerability information contained in the vulnerability inspecting method information 16A needs to be vulnerability information with published specifications, such as OVAL. However, some vulnerability inspection tools 50A execute vulnerability inspection by using vulnerability information that is not published, and the vulnerability information may be impossible to be analyzed in some cases. In such a case, it may be difficult for the extractor 20A to extract the first file path information from the vulnerability inspecting method information 16A in some cases.

On the other hand, in the present, the extractor 21A extracts the first file path information on the basis of the access log 47A and the excluded file information 17A.

Thus, in the information processing apparatus 11 of the present, the access log 47A is used for extracting the first file path information. Therefore, even if vulnerability information with published specifications, such as OVAL, is not used, effects when a vulnerability in the object 30 to be inspected is attacked can be assessed properly.

Moreover, in the information processing apparatus 11, the first file path information is extracted on the basis of the access log 47A and the excluded file information 17A. Therefore, the file path to an unnecessary file can be prevented from being registered in the first management information 16B.

Next, an example hardware configuration of the information processing apparatus 10 and the information processing apparatus 11 of the above-described embodiments will be described.

Figure 10:
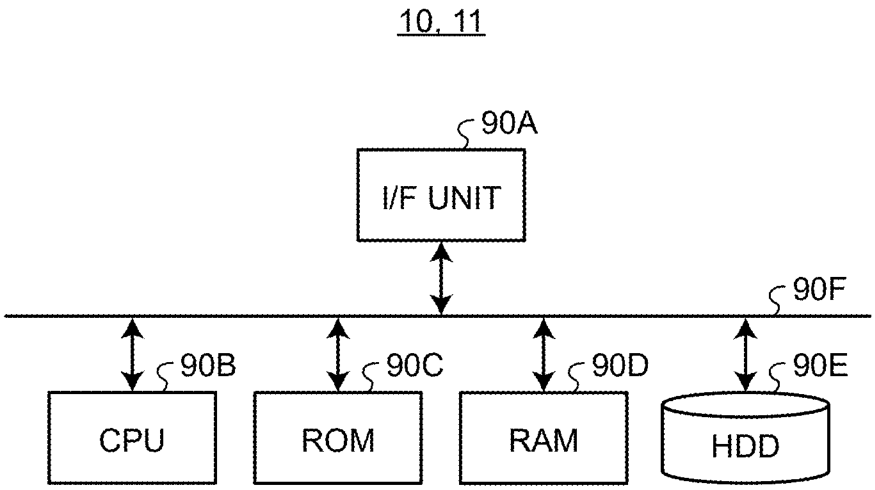
FIG. 10 is a hardware configuration diagram.

FIG. 10 is a diagram of an example hardware configuration of the information processing apparatus 10 and the information processing apparatus 11 of the above-described embodiments.

The information processing apparatus 10 and the information processing apparatus 11 of the above-described embodiments have a hardware configuration that includes a control device, such as a central processing unit (CPU) 90B (an example of the hardware processor), storage devices, such as a read only memory (ROM) 90C, a random access memory (RAM) 90D, and a hard disk drive (HDD) 90E, an I/F unit 90A being an interface with various devices, and a bus 90F connecting each component and that uses a general computer.

In the information processing apparatus 10 and the information processing apparatus 11 of the above-described embodiments, the CPU 90B reads and executes a computer program from the ROM 90C onto the RAM 90D to implement each of the aforementioned components on the computer.

Note that the computer program for executing each piece of the above-described processing executed in the information processing apparatus 10 and the information processing apparatus 11 of the above-described embodiments may be stored in the HDD 90E. Alternatively, the computer program for executing each piece of the above-described processing executed in the information processing apparatus 10 and the information processing apparatus 11 of the above-described embodiments may be provided, preliminarily incorporated in the ROM 90C.

Alternatively, the computer program for executing the above-described processing executed in the information processing apparatus 10 and the information processing apparatus 11 of the above-described embodiments may be provided as a computer program product stored in a computer-readable storage medium, such as a CD-ROM, a CD-R, a memory card, a digital versatile disc (DVD), or a flexible disc (FD), as a file in an installable or executable format. Alternatively, the computer program for executing the above-described processing executed in the information processing apparatus 10 and the information processing apparatus 11 of the above-described embodiments may be stored in a computer connected to a network, such as the Internet, and provided through downloading via the network. Alternatively, the computer program for executing the above-described processing executed in the information processing apparatus 10 and the information processing apparatus 11 of the above-described embodiments may be provided or distributed via a network, such as the Internet.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising a hardware processor connected to a memory and configured to:

extract first file path information indicating a file path of a file used by a vulnerability inspection tool in vulnerability inspection of an object to be inspected, the file path being a file path in the object to be inspected; and register second file path information and the first file path information in correlation with each other in second management information, the second file path information indicating a file path to a file copied from the object to be inspected by using the first file path information.

2. The information processing apparatus according to claim 1, wherein the hardware processor is configured to store, in a file storage area of the memory, the file copied from the object to be inspected by using the first file path information, and the second file path information indicates a file path to the file stored in the file storage area.

3. The information processing apparatus according to claim 2, wherein the hardware processor is configured to:

register the extracted first file path information in first management information, copy the file from the object to be inspected into the file storage area by using the first file path information registered in the first management information; and register the second file path information and the first file path information in correlation with each other in the second management information, the second file path information indicating the file path to the file in the file storage area.

4. The information processing apparatus according to claim 1, wherein the hardware processor is configured to extract the first file path information based on vulnerability inspecting method information used by the vulnerability inspection tool in the vulnerability inspection of the object to be inspected.

5. The information processing apparatus according to claim 1, wherein the hardware processor is configured to extract the first file path information based on an access log and excluded file information, the access log indicating file paths of files accessed by the vulnerability inspection tool to execute the vulnerability inspection of the object to be inspected, the excluded file information defining files not used in the vulnerability inspection, the first file path information to be extracted representing a file path that is indicated by the access log and is used for accessing a file other than the files defined in the excluded file information.

6. The information processing apparatus according to claim 1, wherein the hardware processor is configured to construct a virtual file system in which the first file path information and the file stored in a location indicated by the second file path information correlated with the first file path information are correlated with each other.

7. An information processing method executed by a computer, the method comprising:

extracting first file path information indicating a file path of a file used by a vulnerability inspection tool in vulnerability inspection of an object to be inspected, the file path being a file path in the object to be inspected; and registering second file path information and the first file path information in correlation with each other in second management information, the second file path information indicating a file path to a file copied from the object to be inspected by using the first file path information.

8. A computer program product comprising a non-transitory computer-readable recording medium on which a computer program executable by a computer is recorded, the computer program instructing the computer to perform processing, the processing including:

extracting first file path information indicating a file path of a file used by a vulnerability inspection tool in vulnerability inspection of an object to be inspected, the file path being a file path in the object to be inspected; and registering second file path information and the first file path information in correlation with each other in second management information, the second file path information indicating a file path to a file copied from the object to be inspected by using the first file path information.

* * * * *